United States Patent [19]

Caperton

[11] Patent Number: 5,098,216

[45] Date of Patent: Mar. 24, 1992

[54] INTERLOCKING RODS AND COUPLER

[76] Inventor: Charles B. Caperton, 1221 West Coast Hwy. #207, Newport Beach, Calif. 92663

[21] Appl. No.: 509,891

[22] Filed: Apr. 16, 1990

[51] Int. Cl.⁵ .......................... F16B 1/00; F16D 1/00
[52] U.S. Cl. .................... 403/341; 403/286; 403/393
[58] Field of Search .................. 403/341, 393, 286

[56] References Cited

U.S. PATENT DOCUMENTS

| | | |
|---|---|---|
| 1,975,244 | 10/1934 | Wiseman .............. 403/341 X |
| 2,471,060 | 5/1949 | Cooper . |
| 2,793,060 | 5/1957 | Ciaccio . |
| 3,814,529 | 6/1974 | Caperton .............. 403/393 |

*Primary Examiner*—Andrew V. Kundrat
*Attorney, Agent, or Firm*—Paul & Paul

[57] ABSTRACT

A rod coupling combination is light in weight, compact in design, and having very little mechanical play, employs universal end sections which are compatibly mated with one another. The combination includes interlocking rods and a coupler. The rods each include a shaft having enlarged terminal ends which interlock with other such enlarged terminal ends, each of which includes a pair of square teeth and corresponding recesses. The coupler includes a central body and a pair of end caps, the end caps having externally threaded shanks which are secured to the body. The interlocked terminal ends are secured within the body by the coupler and caps.

4 Claims, 2 Drawing Sheets

INTERLOCKING RODS AND COUPLER

BACKGROUND OF THE INVENTION

1. Field of the Invention

This invention relates generally to coupling sectional rods into one continuous rod, and more specifically to coupling sectional rods into one long continuous rod for use in clearing obstructions in sewers or underground pipes.

2. Brief Description of the Prior Art

Several different types of coupling means for flexible rods or shafts used in "rodding" or clearing obstructed underground pipes or drains are known in the the art. Such rods can be on the order of hundreds of feet long and are coupled end-to-end to provide a total length far exceeding the length of any single rod. These rods must be joined such that torsional forces applied to one end of a first rod in a coupled set of rods will be transmitted through the rod length to the last rod.

Typically, in clearing an obstruction, an assembly of coupled rods is forced down through an underground pipe or drain with rotation of the assembly. More rods are added as the coupled rod assembly is forced through the pipe.

The coupled rod assembly, being flexible, can wind its way through the convolutions of the sewer pipe. It is forced through obstructions and loosens debris in the pipe. The obstructions and debris are later washed through the pipe.

In order to make the coupled rod more efficient at clearing obstructions, a suitable tool, such as a drill, a centrifugal cutter or a root saw, is connected at the leading end of the coupled rod assembly. At the opposite end rotary torsion is applied to the coupled rod assembly. This torsion is transmitted along the length of the rod, through each coupling to the next rod until it ultimately is applied to the end of the last rod. The torsional force applied to the tool at the end of the last rod drills through the obstruction cleaning the sewer pipe.

In addition to being a suitable means for clearing sewer pipes, such coupled rod assemblies are suitable for applying torsional forces to many otherwise inaccessible, remote areas. This permits use of drills, centrifugal cutters or root saws in places where ordinary access would not be allowed.

Such coupled rod arrangements are also suitable for fitting rods through convoluted tubes or passageways. It is used to 'snake' wires through passageways for wiring houses or running telephone line.

U.S. Pat. No. 2,319,892 ("Thomas") shows a means for coupling rods or shafts. An eyelet is shown on the end of a first rod and a corresponding hook on the end of a second rod. The hook fits through the eyelet. A threaded cap surrounds the shaft and near the hook and a capsule having a receiving thread fits around the eyelet. When the hook engages the eyelet the capsule is in proximity of the threaded cap which threads into the capsule. The cap and capsule enclose the hook and eyelet. As torsion is applied to one of the rods, for example, the rod having the hook at its end, the torsional force causes the rod having the eyelet to rotate. The geometry of the hook-eyelet connection allows a degree of rotational play.

U.S. Pat. No. 2,168,759 ("Betzing") discloses a rod coupling device. It employs a capsule and threaded cap similar to Thomas. In Betzing's device there is a pin in the capsule which is perpendicular to the length of the rod. Each rod ends in a semicircular hook. These hooks fit over and catch the cross-pin in the capsule. When both hooks catch the cross-pin the capsule, the cap is then threaded into the capsule enclosing both hooks in the cross-pin. The torsional forces applied to the first rod allow the rod to twist slightly before engaging the cross-pin which rotates the second rod. The slight amount of roll of the rod on the cross-pin allowed in the coupling gives a degree of rotational play.

U.S. Pat. Nos. 3,779,658 ("'658 patent"), U.S. Pat. No. 3,814,529 ("'529"), U.S. Pat. No. 3,873,223 ("'223") all relate to coupling means for joining rod ends. All employ a capsule and screw cap arrangement which encloses flattened ends of the rods to be joined. The capsule of the '223 and the '529 patents employ a three-piece structure comprising two caps in the central capsule section which the caps thread into. Both the '529 and the '223 patents employ a single type of connecting end. This allows any end of a rod to be connected to any other end. The '658 patent employs two differing ends which must be matched together. Since the ends of the rods of the '223, the '658, and the '529 patents employ a flattened design, and the capsules are radially symmetric, there is an intervening space between the capsule and the flattened ends.

SUMMARY OF THE INVENTION

A principal object of this invention is to provide a superior rod coupling combination which will be light in weight, compact in design, having very little mechanical play. It employs universal end sections which are compatibly mated with any other end sections. The combination transmits torsional force efficiently. It also provides very strong resilient joint of comparatively small dimension, permitting more efficient winding of the coupled rod assembly on a reel.

The combination includes two interlocking rods and a coupler. A first rod and second rod each include a shaft having at least one enlarged terminal end which interlocks with another such enlarged terminal end. A shoulder is formed between the shaft and the terminal end.

The at least one enlarged terminal end has a semi-cylindrical outside surface and an inside surface. On the inside surface there is formed at least one square tooth and at least one square recess for receiving a corresponding square tooth formed on the end of a mating rod. The square teeth and recesses are sized and positioned so that two terminal ends can be interlocked. When interlocked, these ends have a generally cylindrical surface. In a presently preferred embodiment of the invention, two square teeth and two recesses are formed in each terminal end.

The coupler is adapted for connecting the first and the second rods together in an overlapping manner for transmitting axial and torsional forces from one rod to the adjacent coupled rod. The coupler includes a central element, a first end cap, and a second end cap. Both the first and the second end caps have an externally threaded shank, which has an outward end, an inward end and an internal bore. The shaft of each rod passes through the internal bore in an end cap. The enlarged terminal ends can be formed on the rods after the rod shank had been threaded through a pair of ends cap, one for securing either end of the rod. The shank of each end cap has a shoulder seat formed at its inward end for bearing against the shoulder formed between the shaft and enlarged terminal of the rod.

The central element has an internal bore for receiving the enlarged terminal ends of a pair of rods and the shanks of the end caps. The internal bore of the central element is internally threaded at both ends, and adapted to receive and secure the externally threaded shanks of the two end caps. The internal bore has a center section defining a support seat. The center section of the bore has a cross-sectional dimension sized to receive the interlocked terminal ends of the rods. The center section receives the interlocked terminal ends of the first and second rod so that the outside cylindrical surface of the inter locked ends is received by and confronts the internal surface of the central section.

Preferably, the outward ends of the end caps are adapted to be engaged by a tool for assembling the combination. For example, a nut can be integrally formed at the outer end, so the the end caps can be grasped by a wrench. Similarly, the central element of the coupling means is preferable adapted to be engaged by a tool for assembling the combination, such as by forming a pair of parallel flat surfaces on the exterior of the central element so that the central section can be grasped with a wrench for assembly.

The exceptional strength for its size is due to the interlocking mating surfaces which fit flat against each other. The coupler which encloses the end sections of the of the rod forces the rod sections towards each other. The coupler fits flush around the joint leaving no gaps between the rod ends in the capsule. Since the coupler fits flush against the joint, it provides support around the entire perimeter of the joint, unlike prior art couplers.

The mating surface at the end of each rod includes at least one square tooth and at least one square recess. The tooth of a first rod fits into the recess of a second rod, while at the same time the tooth of the second rod fits into the recess in the first rod. This creates a solid, interlocking point.

Because they are square, each tooth and recess has side walls perpendicular to the face of the teeth. The side walls aid in the fitting of one rod end into another.

The strength and resiliency of the combination of the present invention allow a smaller, and lighter coupler to accomplish the function. This improved design not only reduces the weight of a length of connected rods using this design, but also allows the lengths of rod to be rolled on spools much easier than with existing couplers.

DETAILED DESCRIPTION OF THE PREFERRED EMBODIMENT

Figure 1:
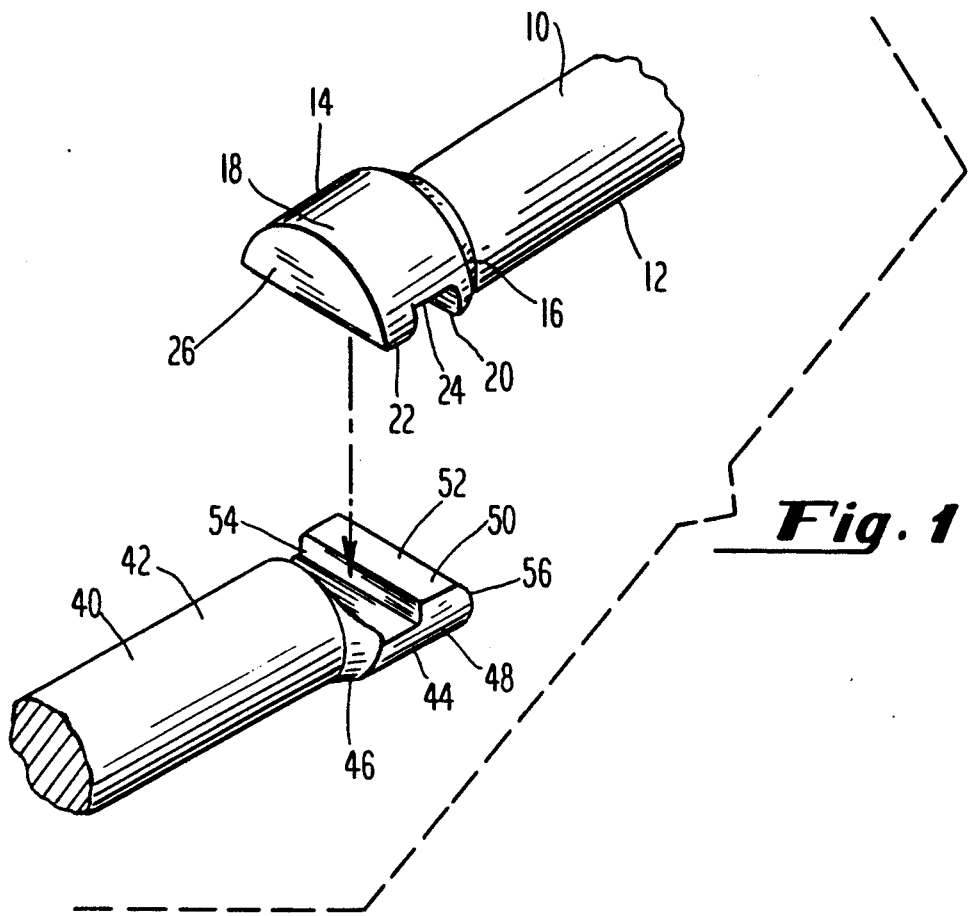
FIG. 1 is an exploded perspective view showing the terminal ends of two rods which are to be coupled together one embodiment of the present invention.

Referring now to the drawings in detail, wherein like reference numerals indicate like elements in each of the several views, reference is first made to FIG. 1, wherein the ends of a pair of rods 10, 40 for use in a first embodiment of the combination of the present invention are shown in an exploded perspective view.

FIG. 1 shows an exploded view of a first rod 10 which is to be coupled with a second rod 40. Rod 10 includes a shaft 12 with an enlarged terminal end 14 formed on at least one end of the rod 10. An inclined shoulder 16 is formed between the shaft 10 and the terminal end 14. The enlarged terminal end 14 has a semi-cylindrical exterior surface 18 and an inside surface 20. A square tooth 22 is formed on the inside surface 20 at the very end the rod 10, and a square recess 24 is formed adjacent the square tooth 22. A perpendicular surface 26 is formed adjacent the tooth 22 at the very end of the rod 10. Rod 40 is identical to rod 10, and has a shaft 42 and a terminal end 44 with a shoulder 46 formed therebetween The enlarged terminal end 44 has both a semi-cylindrical exterior surface 48 and and inside surface 50, with a square tooth 52 formed on the inside surface 50 at the very end of the rod 20, and a square recess 54 formed adjacent the square tooth 52. A perpendicular surface 66 is formed adjacent the square tooth 52 at the very end of the second rod 40.

Figure 2:
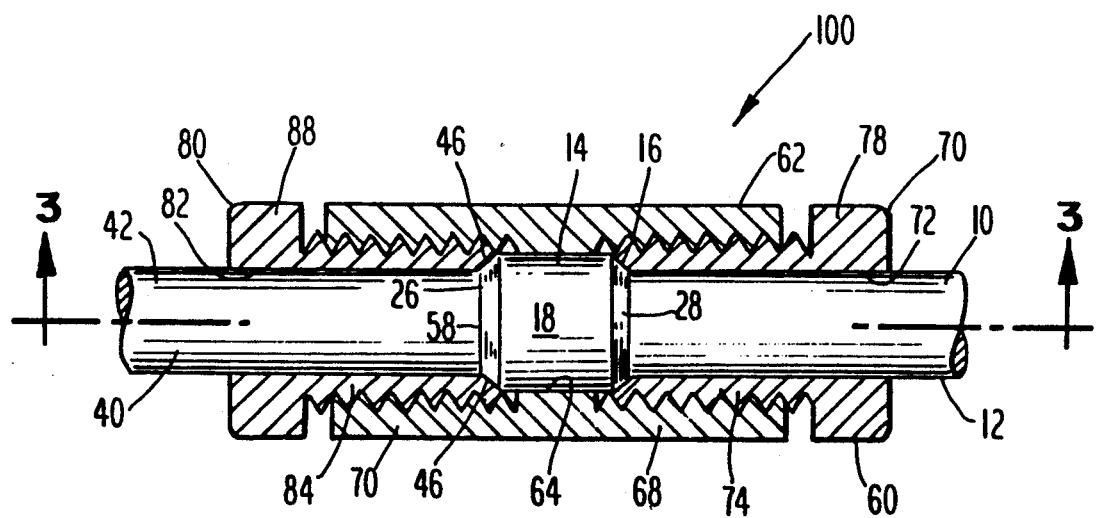
FIG. 2 is a top sectional view of a presently preferred embodiment of the present invention.
Figure 3:
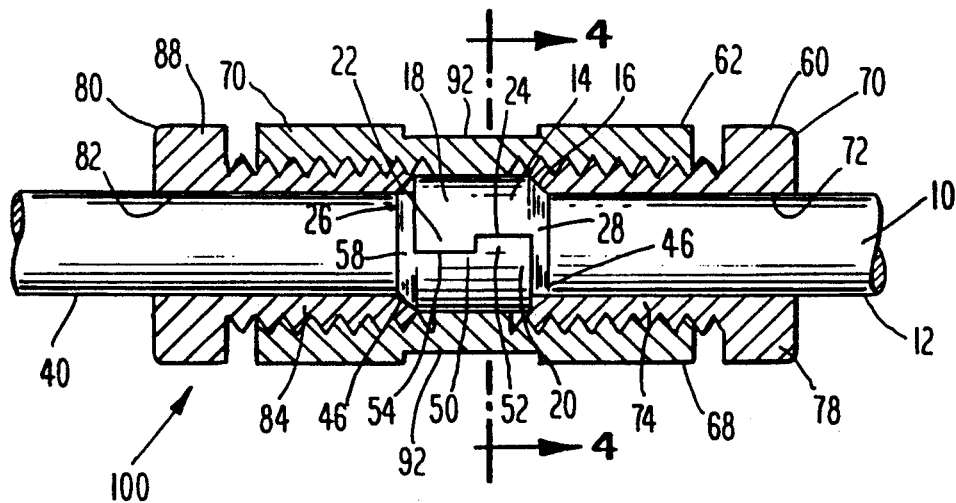
FIG. 3 is a side sectional view of the embodiment of FIG. 2 taken along the line 3—3 of FIG. 1.
Figure 4:
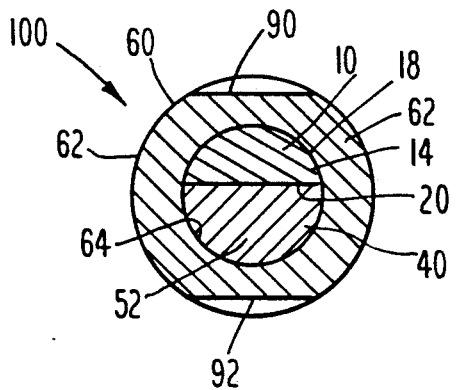
FIG. 4 is a sectional end view of the embodiment of FIG. 2, taken along the line 4—4 of FIG. 3.

The square tooth 22 of the first rod 10 mates or interlocks with the square recess 54 of the second rod 20, and the square tooth 52 of the second rod 20 mates or interlocks with the square recess 22 of the first rod 10 when the rods 10, 40 are assembled as shown by the arrow in FIG. 1 to provide interlocked terminal ends as best seen in FIGS. 2-4.

Rods 10 and 40 increase in diameter from the respective shafts 12, 42 through the shoulders 16, 46 to the enlarged terminal ends 14, 44. The outside surface formed by interlocked terminal ends 14, 44 is generally cylindrical, as best seen in FIGS. 2-4, and of enlarged diameter in comparison with the cross sectional dimensions of the rod shanks 12, 42. Thus, when assembled the enlarged terminal ends 14, 44 form an enlarged cylinder between the shanks 12, 42, with the shoulders 16, 46 between the respective terminal ends 14, 44 and shafts 12, 42.

Referring now to FIG. 2, the interlocking rods 10, 14 are shown enclosed by a coupler 60 to provide a combination 100 according to the present invention. Coupler 60 is comprised of three parts, a central element or body 62 and a first and second generally radially symmetric end caps 70 and 80. Each end cap 70, 80 has a respective through hole or bore 72, 82 large enough to allow the shaft 12, 42 of the respective first or second rod 10, 40 to pass through but smaller than the diameter of the respective terminal end 14, 44. The end caps 70, 80 each have a respective externally threaded shank 74, 84 formed at the inward end thereof, with an end or shoulder seat 76, 86 formed at the very end of the respective shanks 74, 84. The shoulder seats 76, 86 are adapted to bear against the shoulders 28, 58 formed at the ends of the enlarged cylinder when the terminal ends 14, 44 are assembled together.

In manufacturing the combination 100 of the present invention, the end caps 70. 80 can be placed on the rods 10, 40 before the enlarged terminal ends 14, 44 are formed on the rods 10, 40. Typically, a pair of end caps will be place on a rod and then the enlarged terminal ends will be formed at either end, permanently securing the end caps on the rods.

The central element 62 has a generally cylindrical internal bore 64 with a smooth central section 66 and a pair of internally threaded sections 68, 69 on either side of the smooth central section 66. The central section 66 has a a bore having a cross sectional dimension sized to receive the interlocked terminal ends 14, 44 of the first and second rods 10, 40, and defines a support seat for the generally cylindrical assembled terminal ends. The threaded sections 68, 69 are adapted to receive and secure the externally threaded shanks 74, 84 of the end caps 70, 80 to the central element or body 62. The first and second end caps 70, 80 each have a nut 78, 88 integrally formed at the outer ends thereof so that the the end caps can be engaged by a wrench for assembling the coupler 60, as best seen in FIGS. 2 and 3. Also visible in FIGS. 3 are two flattened surfaces 90, 92 formed on the outside of the central element 62 so that the central element 62 can be likewise grasped with a wrench for assembly.

To assemble the combination 100, as shown in FIG. 2, the central element 60 is slid over one of the terminal ends 14 of a the rod 10 onto the rod shaft 12. Rod 10 is then interlinked with rod 40 so that the respective square teeth and recess mesh. The central element 60 is then slid over terminal ends 12 44, and the end caps 60, 80 are slid down from the rod shafts such that shanks 74, 84 engage the threaded sections 68, 69 of the central element 62. The end caps 70, 80 are threaded into the central element 62, and as the end caps are tightened the shoulder seats on the end caps press against the inclined shoulders, securely holding the interlocked terminal ends in position.

Figure 5:
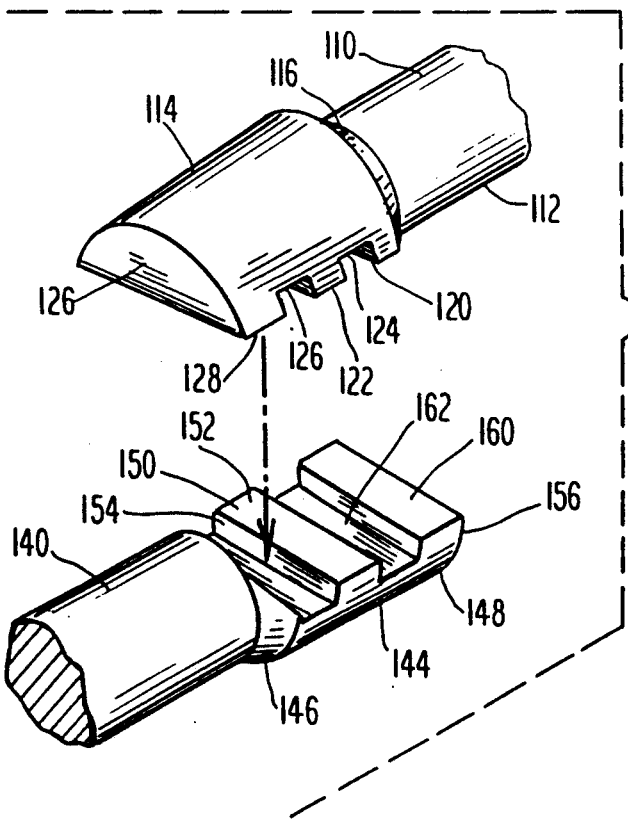
FIG. 5 is an exploded perspective view showing the terminal ends of two rods which are to be coupled together in a second, presently preferred, embodiment of the invention.

In a presently preferred embodiment, the terminal ends are provided with multiple square teeth and interlocking recesses. FIG. 5 shows an exploded view of a first rod 110 which is to be coupled to a second rod 140 in this presently preferred embodiment.

The first rod 110 includes a shaft 112 with an enlarged terminal end 117 formed on at least one end of the rod 110, with a shoulder 116 formed between the shaft 112 and the terminal end 114. The enlarged terminal end has a semi-cylindrical exterior surface 118 and an inside surface 120. Two square teeth 122, 128 are formed on the inside surface 120 proximate the very end of the rod 110, and there are a pair of square recesses 124, 126, one 126 formed between the two square teeth and one 126 adjacent the shaft 112, respectively. The second rod 140 is identical to the first rod 110, and has a shaft 142 and a terminal end 144 with a shoulder 146 formed therebetween, the enlarged terminal end 144 has both a semi-cylindrical exterior surface 148 and an inside surface 150, with a pair of square teeth 152, 160 formed on the inside surface 150 proximate the end of the rod 120, and a pair of square recesses 154, 162 formed between and adjacent the square teeth 152, 160. A perpendicular surface 150 is formed adjacent the second square tooth 160 at the very end of the second rod 140.

Other modifications will be readily apparent to those skilled in the art, all within the scope of the appended claims. For example, the end caps can be knurled for application for pressure, or the inclined shoulders can be perpendicular, rather than inclined at an angle to, the radial axis of the assembled combination.

I claim:

1. A combination of two interlocking rods and a coupler, the combination comprising:
   a first rod, a second rod, and a coupler means;
   the first and second rod each including a shaft having at least one enlarged terminal end, with a shoulder formed between the shaft and the terminal end;
   the at least one enlarged terminal end having a semi-cylindrical outside surface and an inside surface, the inside surface having at least one square tooth and at least one square recess for receiving a corresponding square tooth formed on the end of a mating rod, the square teeth and recesses being sized and positioned such that two terminal ends can be interlocked, a pair of interlocked terminal ends having a generally cylindrical outside surface;
   the coupler being adapted for connecting the first and the second rod together in an overlapping manner for transmitting axial and torsional forces from one rod to an adjacent coupled rod, the couple comprising a central element, a first end cap, and a second end cap;
   the first end cap having an externally threaded shank having an outward end and an inward end and an internal bore, the shaft of the first rod passing through the internal bore, the shank having a shoulder seat at its inward end for bearing against the shoulder of the first rod,
   the second end cap having an externally threaded shank having an outward end and an inward end and an internal bore, the shaft of the second rod passing through the internal bore, the shank having a shoulder seat for bearing against the shoulder of the second rod; and
   the central element having an internal bore, the bore being internally threaded at both ends, and adapted to receive and secure the externally threaded shanks of the first and second end caps, the internal bore having a center section defining a support seat, the center section of the bore having a cross sectional dimension sized to receive the interlocked terminal ends of the first and second rods, the center section receiving the interlocked terminal ends of the first and second rods such that the outside cylindrical surface of the interlocked ends is received by and confronts the internal surface of the central section such that internal surface limits motion of the terminal end with reference to the central element.

2. A combination according to claim 1 wherein the at least one enlarged terminal end has two square teeth and two square recesses.

3. A combination according to claim 1 wherein the outward ends of the first and second end caps are adapted to be engaged by a tool for assembling the combination.

4. A combination according to claim 1 wherein the central element of the coupling means ia adapted to be engaged by a tool for assembling the combination.

* * * * *